(12) United States Patent
Julien et al.

(10) Patent No.: US 12,005,491 B2
(45) Date of Patent: Jun. 11, 2024

(54) INJECTION MOLDING FEEDSTOCK DELIVERY SYSTEM

(71) Applicant: Howmedica Osteonics Corp., Mahwah, NJ (US)

(72) Inventors: Benoit Julien, Verdun (CA); Alexei Mourski, Montreal (CA); Michael Ste-Marie, Saint-Remi (CA)

(73) Assignee: Howmedica Osteonics Corp., Mahwah, NJ (US)

(*) Notice: Subject to any disclaimer, the term of this patent is extended or adjusted under 35 U.S.C. 154(b) by 481 days.

(21) Appl. No.: 17/154,370

(22) Filed: Jan. 21, 2021

(65) Prior Publication Data
US 2021/0237149 A1 Aug. 5, 2021

Related U.S. Application Data
(60) Provisional application No. 62/968,205, filed on Jan. 31, 2020.

(51) Int. Cl.
*B22D 17/20* (2006.01)
*B22F 3/00* (2021.01)
(Continued)

(52) U.S. Cl.
CPC .......... *B22D 17/2015* (2013.01); *B22F 3/003* (2013.01); *B22F 3/225* (2013.01); *B29C 45/18* (2013.01); *B29C 45/53* (2013.01)

(58) Field of Classification Search
CPC .............. B22D 17/2015; B22D 17/203; B22D 17/2053; B22F 3/003; B22F 3/225;
(Continued)

(56) References Cited

U.S. PATENT DOCUMENTS 1,441,603 A 11/1890 Tideman
649,760 A 5/1900 Ruetschi
(Continued)

FOREIGN PATENT DOCUMENTS

DE 102014118852 A1 6/2016
EP 2982429 A1 2/2016
(Continued)

OTHER PUBLICATIONS

European Search Report for EP21154243 completed Jun. 18, 2021; 2 pages.

*Primary Examiner* — S. Behrooz Ghorishi
(74) *Attorney, Agent, or Firm* — Lerner David LLP (57) ABSTRACT

A feedstock delivery system for injection molding includes a vessel unit that includes a vessel with an internal volume and an inlet for receipt of a feedstock. First and second dispensing units are alternatively connectable to the vessel unit and each include first and second ends, first and second valves, and a buffer chamber. The first end is connectable to the dispensing unit such that the buffer chamber is in communication with the internal volume of the vessel. The second end is connectable to an injection mold and defines an outlet of the feedstock delivery system. The outlet is in communication with the buffer chamber, and the buffer chamber is positioned between the first and second valves. The buffer chamber of the first dispensing unit defines a first chamber volume, and the buffer chamber of the second dispensing unit defines a second chamber volume greater than the first chamber volume.

19 Claims, 10 Drawing Sheets

(51) Int. Cl.
  *B22F 3/22* (2006.01)
  *B29C 45/18* (2006.01)
  *B29C 45/53* (2006.01)

(58) Field of Classification Search
  CPC ........ B22F 3/004; B01F 23/53; B01F 23/711; B01F 27/808; B01F 33/5024; B01F 33/70; B01F 35/7543; B01F 35/92; B29C 45/18; B29C 45/53; B29C 31/02; B29C 31/04; B29C 2045/466; B29B 13/022
  See application file for complete search history.

(56) References Cited

U.S. PATENT DOCUMENTS

| | | | |
|---|---|---|---|
| 2,412,658 | A | 12/1946 | Stuart et al. |
| 2,434,557 | A | 1/1948 | Fox, Jr. et al. |
| 2,590,157 | A | 3/1952 | Corbett |
| 3,167,810 | A | 2/1965 | Soderquist |
| 3,245,130 | A | 4/1966 | Dowley et al. |
| 3,460,810 | A | 8/1969 | Mueller |
| 3,612,147 | A | 10/1971 | Kaplan |
| 3,638,673 | A | 2/1972 | Stanciu |
| 3,659,729 | A | 5/1972 | Lamkemeyer |
| 3,746,489 | A * | 7/1973 | Rizzi ................ B29C 48/39 425/204 |
| 3,805,875 | A | 4/1974 | Daugherty et al. |
| 3,810,730 | A | 5/1974 | Carlsson |
| 3,982,635 | A | 9/1976 | Chin et al. |
| 4,255,060 | A | 3/1981 | Manfroni |
| 4,416,603 | A | 11/1983 | Peltsman et al. |
| 4,436,478 | A | 3/1984 | Allen et al. |
| 4,695,242 | A | 9/1987 | Hattori et al. |
| 4,714,419 | A | 12/1987 | Nielsen |
| 4,824,359 | A | 4/1989 | Poehlsen |
| 4,853,518 | A | 8/1989 | Bravo |
| 4,971,544 | A | 11/1990 | Schneeberger |
| 4,993,937 | A | 2/1991 | Ginnasi |
| 5,024,593 | A | 6/1991 | Hehl |
| 5,039,299 | A | 8/1991 | Hehl |
| 5,142,956 | A | 9/1992 | Ueno et al. |
| 5,795,601 | A * | 8/1998 | Yamada ............... B28B 17/026 425/584 |
| 6,234,660 | B1 | 5/2001 | Hullmann et al. |
| 6,413,034 | B1 | 7/2002 | Wen-Yung |
| 7,178,974 | B1 | 2/2007 | Bell |
| 8,746,004 | B2 | 6/2014 | Jejcic |
| 10,035,111 | B2 | 7/2018 | Jarrousse et al. |
| 2003/0102599 | A1 | 6/2003 | Du Toit |
| 2007/0092590 | A1 | 4/2007 | Bonzi |
| 2008/0056876 | A1 | 3/2008 | Downard |
| 2008/0101150 | A1* | 5/2008 | George ................. B01F 23/53 366/8 |
| 2008/0166209 | A1 | 7/2008 | Kintzinger et al. |
| 2009/0133429 | A1* | 5/2009 | Petersen ................ A23G 9/222 62/342 |
| 2010/0300437 | A1 | 12/2010 | Sivigny et al. |
| 2012/0252651 | A1 | 10/2012 | Hoffmann |
| 2013/0224323 | A1 | 8/2013 | Meinzinger et al. |
| 2014/0042193 | A1* | 2/2014 | Aspacher ............... B22D 39/02 222/596 |
| 2015/0122294 | A1 | 5/2015 | Wang et al. |
| 2015/0152292 | A1 | 6/2015 | Chartrel |
| 2015/0202790 | A1 | 7/2015 | Patterson et al. |
| 2015/0224712 | A1 | 8/2015 | Tjellesen et al. |
| 2015/0298906 | A1 | 10/2015 | Marastoni |
| 2015/0299466 | A1 | 10/2015 | Qiu et al. |
| 2016/0114489 | A1 | 4/2016 | Goudy |
| 2016/0175783 | A1 | 6/2016 | Jarrousse et al. |
| 2016/0186314 | A1 | 6/2016 | Parent et al. |
| 2016/0190582 | A1 | 6/2016 | Son et al. |
| 2016/0230138 | A1 | 8/2016 | Damren et al. |
| 2016/0279589 | A1 | 9/2016 | Lester et al. |
| 2016/0310921 | A1 | 10/2016 | Zhang et al. |
| 2016/0312122 | A1 | 10/2016 | Mansour |
| 2016/0313062 | A1 | 10/2016 | Yang et al. |
| 2016/0366906 | A1 | 12/2016 | Geng et al. |
| 2016/0376515 | A1 | 12/2016 | Sangwai |
| 2017/0028589 | A1 | 2/2017 | Capobianco et al. |
| 2017/0042179 | A1 | 2/2017 | Thomas |
| 2017/0095778 | A1 | 4/2017 | Henf |
| 2017/0106345 | A1 | 4/2017 | Fal et al. |
| 2017/0261411 | A1 | 9/2017 | Vallayer et al. |
| 2017/0292228 | A1 | 10/2017 | Jones et al. |
| 2018/0071696 | A1 | 3/2018 | Samarao |
| 2018/0117553 | A1 | 5/2018 | Lohmann |
| 2018/0178176 | A1 | 6/2018 | Morinaga et al. |
| 2018/0214830 | A1 | 8/2018 | Kariyama et al. |
| 2018/0244961 | A1 | 8/2018 | Abendschon et al. |
| 2018/0255986 | A1 | 9/2018 | Kitsui |
| 2018/0288831 | A1 | 10/2018 | McKellar |
| 2019/0134712 | A1 | 5/2019 | Demers et al. |
| 2019/0270056 | A1 | 9/2019 | Gruber |

FOREIGN PATENT DOCUMENTS

| | | | |
|---|---|---|---|
| EP | 3225302 | A1 | 10/2017 |
| FR | 3025729 | A1 | 3/2016 |
| GB | 1361661 | A | 7/1974 |
| JP | 2004352831 | A * | 12/2004 |
| JP | 6186095 | B1 | 8/2017 |
| WO | 2008098706 | A1 | 8/2008 |
| WO | 2011127456 | A2 | 10/2011 |
| WO | 2011127456 | A3 | 12/2011 |
| WO | 2014064614 | A1 | 5/2014 |
| WO | 2016062831 | A1 | 4/2016 |
| WO | 2016084440 | A1 | 6/2016 |
| WO | 2016162312 | A1 | 10/2016 |
| WO | 2016162313 | A1 | 10/2016 |
| WO | 2017002905 | A1 | 1/2017 |
| WO | 2017036772 | A1 | 3/2017 |

* cited by examiner

INJECTION MOLDING FEEDSTOCK DELIVERY SYSTEM

CROSS-REFERENCE TO RELATED APPLICATIONS

This application claims the benefit of the filing date of U.S. Provisional Patent Application No. 62/968,205, filed Jan. 31, 2020, the disclosure of which is hereby incorporated herein by reference.

BACKGROUND OF THE INVENTION

Orthopedic instruments and implants are commonly made from metallic materials and manufactured via casting, forging, and machining techniques. Additive manufacturing techniques have been more recently introduced to the field and are becoming an increasingly popular way to manufacture metal parts at least due to the intricate shapes that it can form. Another manufacturing technique that exists that is capable of manufacturing metallic parts is metal injection molding ("MIM"). Unlike the other techniques previously mentioned, MIM has seen limited use in the medical device industry and other industries that require high quality results, such as the aerospace industry.

MIM is commonly performed with high pressure injection molding machines found in the plastics industry. In this regard, a feedstock comprised of metal powder and a binder material are typically loaded via a hopper into a screw and barrel assembly. The binder commonly includes polymer materials which are melted at high temperatures generally above 150 degrees Celsius within the barrel via resistive heating as the feedstock is propelled along the barrel via the screw and toward the mold. The screw generates high pressures, such as up to 9000 psi, in order to sufficiently dispense an appropriate volume of the viscous feedstock into the mold. However, the high pressures generated by such a process and the arrangement of the feedstock feeding equipment results in transient feedstock properties that lead to inconsistent results. Such inconsistencies become more prevalent with increasing part volume. In this regard, MIM has generally been relegated to small volume components that are on average less than 3 cc with an average weight for stainless steel components being below 20 g. Performing MIM at high pressure and high temperature also contributes to long cycle times and wear and tear on equipment including the molds which are generally expensive and bulky in order to withstand the high pressures. Another problem with high pressure MIM is that it limits the volumetric loading of metallic powders such that metal powders comprise less than 65% of the feedstock's total volume. Thus, when the binder is removed during a debinding process and heated via sintering, the volume of the part typically shrinks by about 15-18%. This level of shrinkage can results in the warping of surfaces and other defects. It also makes it difficult to achieve the desired size.

Low pressure metal injection molding ("LPMIM") can solve the quality control problems attendant to high pressure and high temperature techniques as well as provide the added benefits of less bulky and, consequently, cheaper equipment. However, LPMIM has its own challenges in terms of consistent quality. In this regard, in order to flow a metal powder based feedstock into a mold under low pressure conditions, such feedstock generally has compounds within it, such as waxes, that give the feedstock a low viscosity compared to that found in high pressure MIM. However, such compounds have densities that are very sensitive to temperature changes. As such, the introduction of temperature variations in the feedstock along the feedstock's flow path into the injection mold can have detrimental effects on the quality of the end project. Therefore, common equipment utilized in MIM, such as the screw and barrel assembly mentioned above, are not sufficient for LPMIM. Thus, further improvements are desirable.

BRIEF SUMMARY OF THE INVENTION

In a first aspect of the present disclosure, a feedstock delivery system for injection molding includes a vessel unit that has a vessel that defines an internal volume thereof and an inlet opening that communicates with the internal volume. The inlet opening defines an inlet of the feedstock delivery system for receipt of feedstock into the internal volume. The system also includes a dispensing unit that has a first end, a second end, and a dispensing unit conduit disposed therebetween. The first end is connected to the vessel unit such that the dispensing unit conduit is in communication with the internal volume of the vessel. The second end is configured to connect to an injection mold and has an outlet opening that defines an outlet of the feedstock delivery system. The system also includes a fluid jacket that encloses at least a portion of the vessel and at least a portion of the first dispensing unit conduit of the dispensing unit such that heated fluid flowing through the fluid jacket transforms the feedstock into a feedstock slurry and maintains the feedstock slurry at a constant temperature as it is dispensed from the internal volume of the vessel unit and out through the outlet opening of the dispensing unit via at least the dispensing conduit.

Additionally, the vessel unit may include an outlet opening and a valve positioned at the outlet opening of the vessel. The valve may be configured to regulate a flow of the feedstock slurry from the internal volume of the vessel to the dispensing unit. The valve may have a head configured to move from a first position in which it obstructs the outlet opening of the vessel to a second position in which the outlet opening of the vessel is unobstructed by the head allowing feedstock slurry to flow therethrough. The head may be configured to move linearly from the first position to the second position.

Continuing with this aspect, the vessel unit may include a vessel unit conduit extending from the outlet opening of the vessel to the first end of the dispensing unit. The vessel unit conduit may be enclosed by the fluid jacket. The system may also include an air compressor connected to the vessel and in communication with the internal volume thereof such that compressed air from the air compressor imposes a pressure on the feedstock slurry to dispense the feedstock slurry from the internal volume of the vessel to the dispensing unit when the valve is in the second position. The system may further include a variable speed agitator disposed within the vessel for agitating feedstock slurry contained therein.

Furthermore, the first conduit may extend from the first end to the second end of the dispensing unit. The dispensing unit may also include a second conduit, a buffer chamber, and a piston within the buffer chamber. The buffer chamber may be in communication with the first and second conduits and disposed therebetween. The dispensing unit may include first and second valves. The first valve may be arranged on the first conduit to regulate flow of the feedstock slurry between the first conduit and buffer chamber. The second valve may be arranged on the second conduit to regulate flow of the feedstock slurry between the buffer chamber and second conduit. The second conduit may define the outlet opening of the feedstock delivery system.

Moreover, the feedstock delivery system may include a fluid circulator module that communicates with the fluid jacket and is configured to heat a fluid and circulate the fluid through the fluid jacket. The fluid jacket may include a first fluid jacket at least partially enclosing the vessel of the vessel unit and a second fluid jacket at least partially enclosing the first conduit of the dispensing unit. The first and second fluid jackets may be separate from each other such that fluid flowing through the first fluid jacket is isolated from fluid flowing through the second fluid jacket.

In another aspect of the present disclosure, a feedstock delivery system for injection molding includes a vessel unit that has a vessel that defines an internal volume thereof and an inlet opening that communicates with the internal volume for receipt of feedstock into the internal volume. The system also includes first and second dispensing units that are alternatively connectable to the vessel unit and that each have first and second ends, first and second valves, and a buffer chamber. The first end is connectable to the dispensing unit such that the buffer chamber is in communication with the internal volume of the vessel. The second end is connectable to an injection mold and defines an outlet of the feedstock delivery system. The outlet is in communication with the buffer chamber, and the buffer chamber is positioned between the first and second valves. The buffer chamber of the first dispensing unit defines a first chamber volume, and the buffer chamber of the second dispensing unit defines a second chamber volume greater than the first chamber volume.

Additionally, the first dispensing unit may include a first fluid jacket that encloses the buffer chamber thereof, and the second dispensing unit may include a second fluid jacket that encloses the buffer chamber thereof. The vessel unit may include a third fluid jacket enclosing the vessel. The first and second dispensing units may each include a piston disposed within their respective buffer chambers.

Furthermore, the system may include a third dispensing unit that has a first end, a second end, and a conduit extending uninterrupted from the first end to the second end thereof. The first end may be connectable to the vessel unit and the second end may define an outlet of the feedstock delivery system when the third dispensing unit is connected to the vessel unit. The first and second valves may each include a ball and a spring, the spring of the second valve having a greater spring stiffness than the spring of the first valve. The first and second valves may be axially arranged in a direction of a feedstock slurry flow such that the balls of the first and second valves travel linearly in a direction with the feedstock slurry flow.

In a further aspect of the present disclosure, a method of metal injection molding includes mixing a feedstock that includes a metal powder and a binder. The binder may be in a solid state. The method also includes placing the feedstock in a vessel of a vessel unit, circulating heated fluid through a jacket disposed around the vessel to transform the binder to a liquid state and to form a feedstock slurry, dispensing a shot of the feedstock slurry into an injection mold, and forming a green-part via the injection mold.

Additionally, the shot of the feedstock slurry may have a volume less than a total volume of feedstock slurry within the vessel. Also, the dispensing step may include opening a first valve of a dispensing unit, filling a buffer chamber of the dispensing unit with feedstock slurry while the first valve is open, closing the first valve when the buffer chamber is filled, opening a second valve of the dispensing unit, and injecting feedstock slurry into the injection mold from the buffer chamber. Furthermore, the injecting step may include actuating a piston within the buffer chamber. The method may also include circulating heated fluid through a sleeve surrounding the buffer chamber. The green-part may have a shape of a femoral component of a knee joint prosthesis.

BRIEF DESCRIPTION OF THE DRAWINGS

The features, aspects, and advantages of the present invention will become better understood with regard to the following description, appended claims, and accompanying drawings in which:

DETAILED DESCRIPTION

FIGS. 1-7 depict an injection mold system according to an embodiment of the present disclosure. The injection mold system generally includes a feedstock delivery system 10, a mold unit 200, a fluid circulator module 14, controller 12, air compressor 16, and vacuum pump 18.

Figure 1:
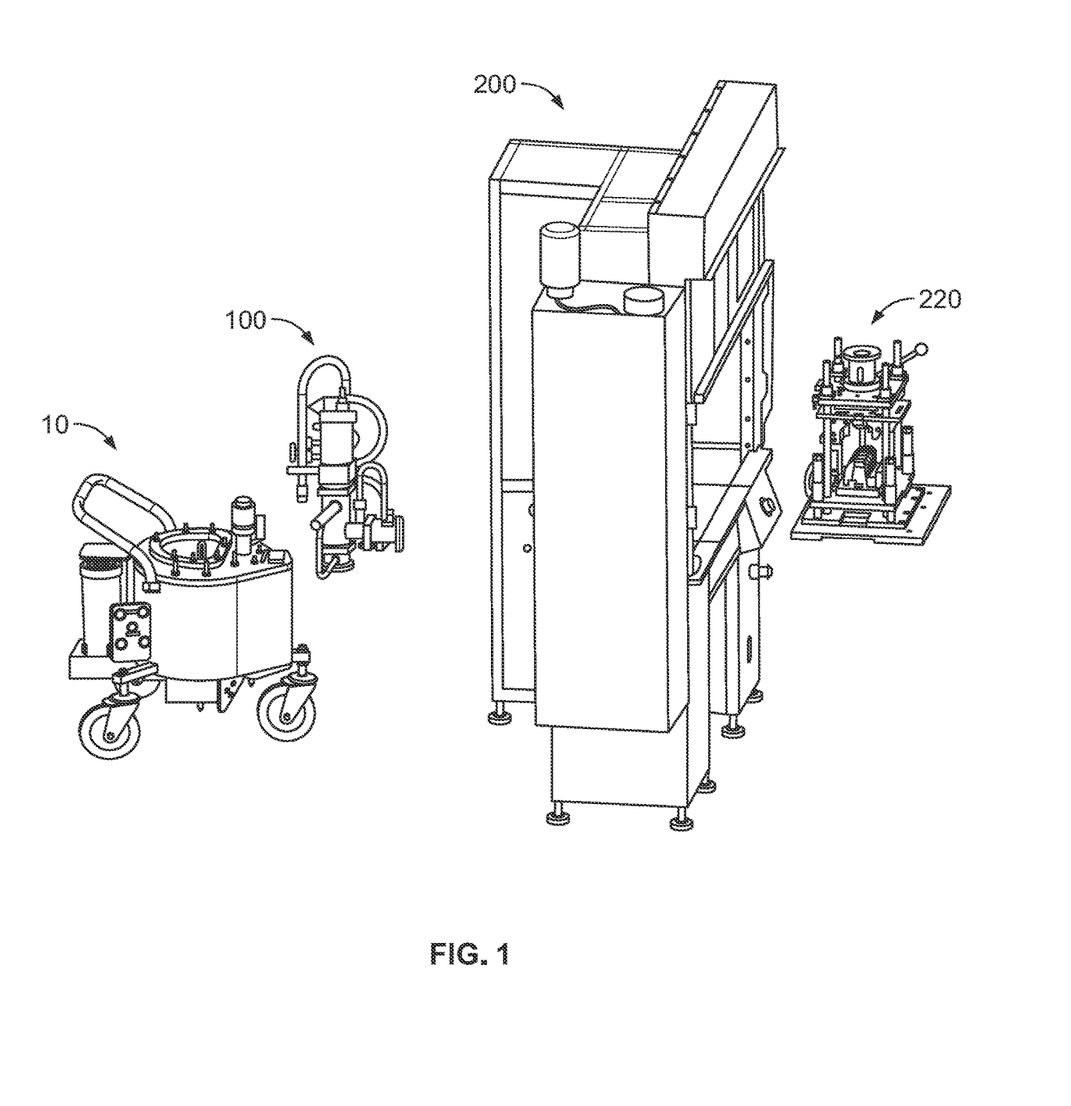
FIG. 1 is an exploded view of an injection molding system including a feedstock delivery system and an injection unit according to an embodiment of the present disclosure.
Figure 2:
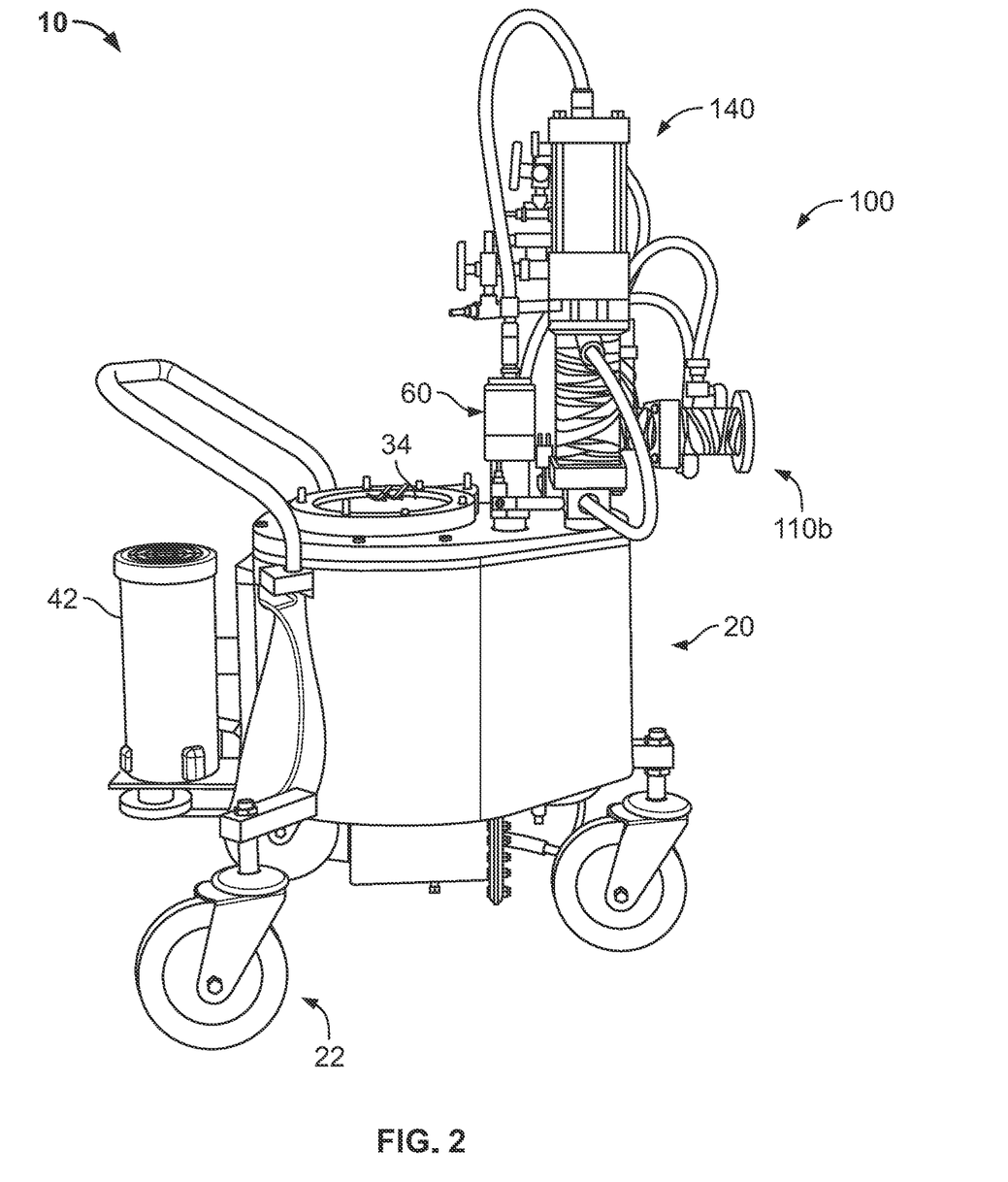
FIG. 2 is a perspective view of the feedstock delivery system of FIG. 1.

Feedstock delivery system 10 generally includes a vessel unit 20 and a dispensing unit 100. As described below, feedstock delivery system 10 is configured to condition and dispense feedstock material, particularly LPMIM feedstock material, into an injection mold. LPMIM is generally characterized by a low viscosity feedstock and low pressure feedstock dispensing to a mold, such as at about 30 psi to about 400 psi.

An LPMIM feedstock includes a binder and a metallic powder and is characterized by a low viscosity in a slurry state. Such viscosity may be less than 50 Pa-s at 10 Hz. Binder materials generally include polymers and waxes, such as various combinations of polyethylene, polyethylene glycol, polymethyl methacrylate, polypropylene, paraffin wax, bees wax, oleic acid, stearic acid, PE-EVA copolymer, carnuba wax, and the like. Powders may include powders of gas atomized metallic material such as of stainless steel, titanium, cobalt chromium, molybdenum, and alloys thereof. An exemplary feedstock includes one or more of the aforementioned powders with 80% of the particles having a diameter of less than 22 microns and a binder that is made of 85% paraffin wax, 5% bees wax, 5% stearic acid, and 5%

PE-EVA copolymer. In addition, such feedstock is preferably highly loaded with powder (i.e., 70% or more of the feedstock's total volume is metallic powder). Such powder loading limits volume shrinkage of the final component to about 10% to 12%.

Figure 3:
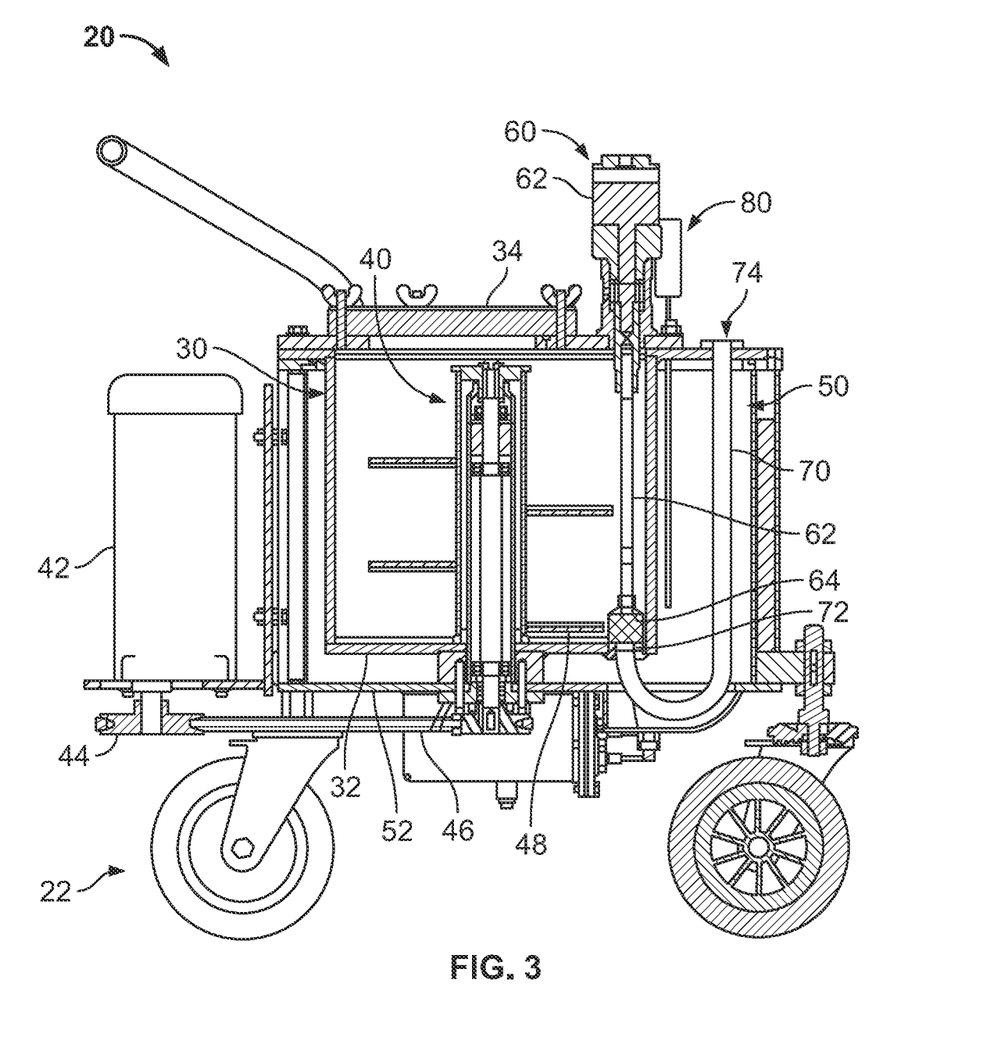
FIG. 3 is a cross-sectional view of a vessel unit of the feedstock delivery system of FIG. 2 taken along a midline thereof.

Vessel unit 20 generally includes a vessel 30, a fluid jacket 50, an agitator 40, a vessel valve 60, and a thermocouple 80. Vessel unit 20 may be a portable unit. In this regard, vessel unit 20 may also include wheels 22 on which the foregoing vessel unit components are mounted. Vessel 30 is a container that has vessel walls 32 that define an internal volume thereof. Such internal volume may be about 5 to 20 Liters. Vessel 32 has an inlet window at a top end thereof that is covered by a door 34. The inlet window defines an inlet of vessel unit 20 and is large enough to receive raw feedstock therethrough for depositing into vessel 30. Door 34 is configured so that that it forms an air-tight seal when closed. Vessel 30 also has a vessel outlet 72 at a bottom end thereof through which a feedstock slurry is dispensed. Outlet 72 is positioned at the bottom of vessel 30 so that a pressure head can be created to help drive such slurry through the outlet 72 to the mold. Such pressure head may be generated by the slurry itself and by a layer of compressed air above the slurry and within vessel 30, as described in more detail below. In addition, positioning the outlet at the very bottom of vessel 30 helps prevent metal powder from settling below the outlet 72 and becoming trapped within vessel 30.

Agitator 40 includes agitator arms or impellers 48, a motor 42, gear 44, and a drive belt 46. The agitator impeller 48 is positioned within vessel 30 in order to agitate a feedstock slurry within vessel 30 so as to maintain a homogenous suspension. Motor 42 is mounted external to vessel 30 and connected to agitator impeller 48 via a drive belt 46. Motor 42 is a variable speed motor which can be controlled to adjust the vigorousness of agitation which can help maintain constant temperature of the feedstock in vessel 30 (i.e., within +/−1 degree Celsius from the setpoint). In other words, the speed of the agitator motor 42 can be varied to avoid uncontrolled heating of the slurry by viscous dissipation in circumstances where the shear rate becomes too high.

Vessel valve 60 includes a valve head 64, valve stem 62, and a valve actuator 62. Valve head 64 is positioned within vessel 30 and adjacent to vessel outlet 72. Valve stem 62 is connected to valve head 64 and extends through vessel 30 to valve actuator 62 which is mounted to a top-side of vessel unit 20. Valve actuator 62 is a linear actuator that is configured to move valve stem 62 and, consequently, valve head 64 up and down in a linear path. In the embodiment depicted, linear actuator 62 is pneumatically driven. However, linear actuator 62 may alternatively be electrically driven. Valve actuator 62 drives valve stem 62 up and down from a first position in which valve head 64 obstructs vessel outlet 72 and a second position in which valve head 64 does not obstruct vessel outlet 72. Such linear movement of valve head 64 allows a feedstock slurry to flow under laminar flow conditions through vessel opening 72 so as to avoid creating the kind of localized turbulence that may be experienced with other types of valves, such as rotating or gate-type valves. Such turbulence can affect the homogeneity of a feedstock and create localized pockets of powder which dilutes the feedstock. Vessel valve 60 is configured to avoid such turbulence.

In the embodiment depicted, vessel unit also includes a conduit 70 that extends from vessel outlet 72 to a top-side of vessel unit 20. Such conduit 70 defines an outlet of vessel unit 20 and redirects feedstock from the vessel outlet 72, which is at the bottom of vessel 30, to the top-side of vessel unit 20 where it is transferred to dispensing unit 100.

Fluid jacket 50 is a fluid vessel that surrounds feedstock vessel 30 and conduit 70, as best shown in FIG. 3. Jacket 50 includes one or more jacket walls 52 that are exterior to and encompass vessel 30 and conduit 70. Jacket walls 52 partially define a fluid cavity that has at its outer boundary the jacket walls 52 and at its inner boundaries, the vessel walls 32 and conduit 70. Fluid jacket 50 is configured to receive and circulate a heated fluid, such as heated oils, so as to transfer heat from the fluid to vessel 30 and conduit 70 in order to help maintain a constant feedstock temperature within vessel 30 and conduit 70 (i.e., within +/−1 degree Celsius from setpoint). A thermocouple 80 or other monitoring device may be positioned within fluid jacket 50 in order to monitor the conditions of the heated fluid in real time.

Figure 4:
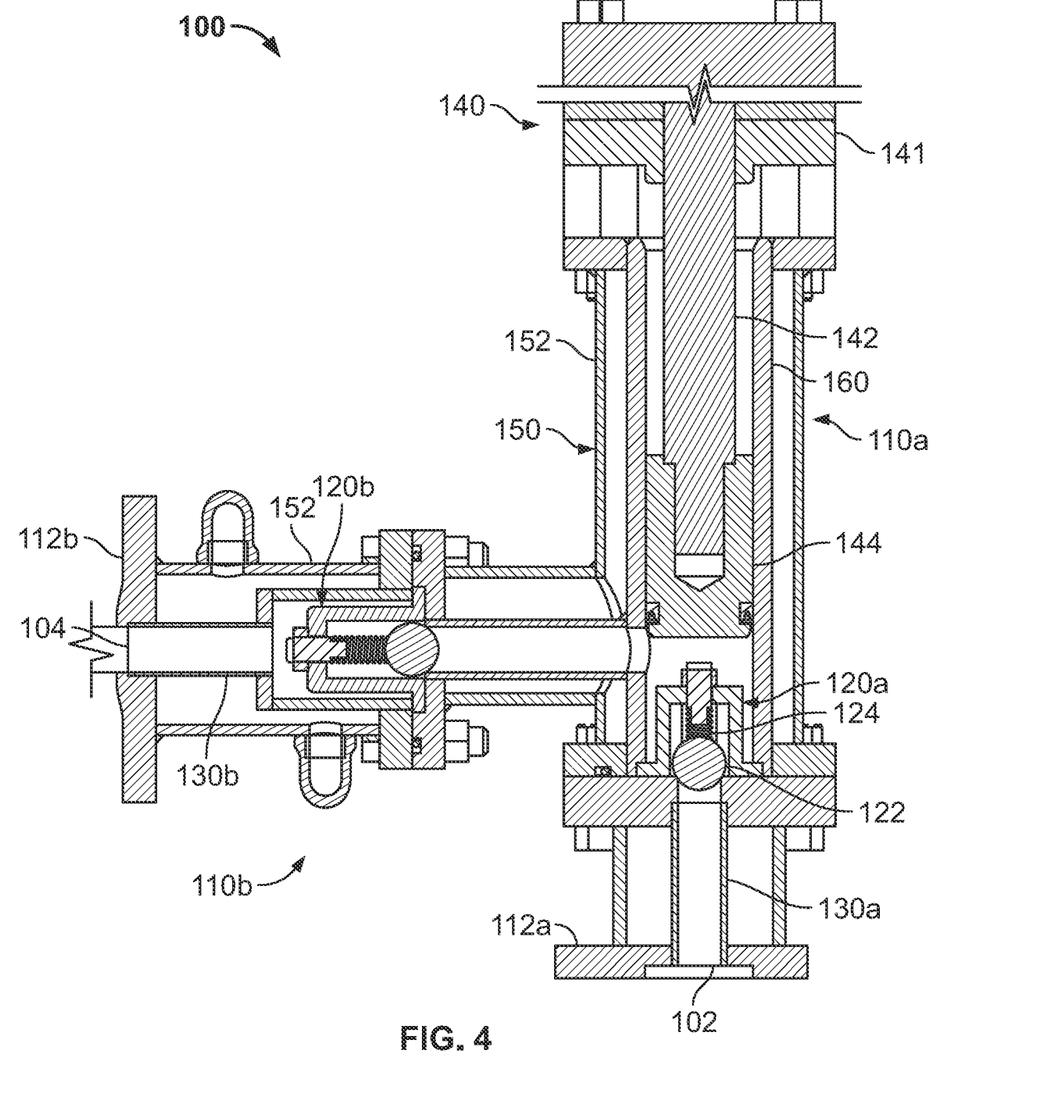
FIG. 4 is a cross-sectional view of the dispensing unit of the feedstock delivery system of FIG. 2 taken along a midline thereof.

Dispensing unit 100, as best shown in FIG. 4, is a modular valve assembly that generally includes a plurality of conduits 130a-b, a buffer chamber 160, a piston assembly 140, and a plurality of cut-off valves 120a-b. As shown, these features are arranged into a vertical branch 110a and an adjoining horizontal branch 110b.

Vertical branch 110a defines a first end of dispensing unit 100 and a corresponding inlet 102 of dispensing unit 100. Vertical branch 110a includes a flange 112a arranged at the first end for connecting to vessel unit 20 and a first or inlet conduit 130a which defines the inlet to dispensing unit 100. Vertical branch 110a also includes buffer chamber 160 downstream of inlet conduit. Buffer chamber 160 is generally a cylindrical chamber with a defined volume. Such defined volume corresponds to a desired shot volume for an injection molding process. In this regard, multiple dispensing units 100 may be provided to modularly connect to vessel unit in order to flexibly adjust to the demands of a particular product run. For example, a first dispensing unit 100 may have a buffer chamber 160 with a volume of 100 cc, and a second dispensing unit 100 may have a buffer chamber 160 with a volume of 300 cc. Thus, the first dispensing unit 100 could be connected to vessel unit 20 and consistently measure out and dispense a feedstock shot of 100 cc to produce a first part while the second dispensing unit 100 could do the same to produce a feedstock shot of 300 cc for a second part. It is contemplated, that a multitude of other dispensing units 100 could be provided each with a different buffer chamber volumes. Such volumes could vary in 50 cc intervals from 50 cc to 1000 cc, for example.

Vertical branch 110a also includes piston assembly 140. Piston assembly 140 includes a piston actuator 141, a piston shaft 142, and a piston head 144. Piston head 144 is positioned within buffer chamber 160. Piston shaft 142 connects to piston head 144 and extends out of buffer chamber 160 where it is connected to piston actuator 141. Piston actuator 141 is a linear actuator that may be pneumatically operated, as in the depicted embodiment. In another embodiment, actuator 141 may be an electrically operated actuator, such as a servomotor, for example. Such electrically driven actuator may provide flexibility regarding molding parameters such as flow rate, injection speeds, and packing pressures developed at the end of the molding cycle as such actuators can finely controlled. Thus, piston 144 is moveable between a first and second position. The first position is shown in FIG. 4. In this position, piston 140 is fully extended into buffer chamber 160 so as to be positioned at a bottom end of chamber 160 and so as to obstruct the flow of feedstock into buffer chamber 160. In a second position (not shown), piston 140 is fully retracted such that piston head 144 is positioned near a top end of buffer chamber 160 which allows feedstock to occupy buffer chamber 160. As described below, operating the actuator 141 to move the piston 144 back to the first position while feedstock occupies the buffer chamber 160 causes feedstock to be expelled from the buffer chamber 160 and dispensed out of the horizontal branch 110b.

The vertical branch 110a further includes a first cut-off valve 120a between inlet conduit 130a and buffer chamber 160. Such cut-off valve 120a regulates the flow of feedstock slurry into buffer chamber 160. First cut-off valve 120a is a check valve that has a spring and ball construction in which the spring 124 compresses in the flow direction when the pressure of the feedstock slurry is sufficient to overcome the spring's stiffness. Such compression allows the ball 122 to move in the flow direction to unobstruct the inlet conduit 130a thereby allowing feedstock to flow into buffer chamber 160 until it is filled. The ball and spring construction and the linear movement in the flow direction promotes laminar flow of the feedstock slurry so as to not disrupt the homogeneity of the feedstock with turbulent flow.

Horizontal branch 110b defines a second end of dispensing unit 100. Horizontal branch 110b includes a second or outlet conduit 130b, a second cut-off valve 120b, and a flange 112b. The flange 112b is arranged at the second end of unit 100 and is configured to connect to mold unit 200, as described further below. Outlet conduit 130b defines an outlet 104 of dispensing unit and communicates with buffer chamber 160. Second cut-off valve 120b is positioned on outlet conduit 130b between buffer chamber 160 and outlet opening 104. Such cut-off valve 120b is similar to valve 120a in that cut-off valve 120b has a spring and ball construction in which the spring 124 compresses in the flow direction when the pressure of the feedstock slurry is sufficient to overcome the spring's stiffness. Such compression allows the ball 122 to move in the flow direction thereby allowing feedstock to flow from the buffer chamber 160 and out of outlet 104 of dispensing unit 100. The ball and spring construction and the linear movement in the flow direction promotes laminar flow of the feedstock slurry so as to not disrupt the homogeneity of the feedstock with turbulent flow.

The spring stiffness of second cut-off valve 120b may be greater than that of first cut-off valve 120a. This prevents second cut-off valve 120b from accidentally opening while first cut-off valve 120a is opened and buffer chamber 160 is filled with feedstock. It is also noted that, while first and second cut-off valves 120a-b open in the flow direction, the relationship of such valves 120a-b relative to buffer chamber 160 (i.e., upstream and downstream, respectively) creates a reverse operation when piston 140 is actuated. Thus, when a volume of feedstock is within buffer chamber 160 and piston 140 is operated to move to the first position, feedstock moves in the flow direction relative to second cut-off valve 120b such that second cut-off valve 120b opens to allow the feedstock to flow out through horizontal branch 110b. However, when piston 140 is actuated, feedstock moves in a direction opposite the flow direction of the first cut-off valve 120a which helps keep first cut-off valve 120a closed.

Dispensing unit 100 further includes a fluid jacket 150 similar to the fluid jacket 50 previously described with regard to vessel unit 20. In this regard, fluid jacket 150 is defined by an exterior wall 152 that encompasses the volume of dispensing unit 100 that receives feedstock at some point during operation. Thus, fluid jacket 150 has an outer wall 152 that extends vertically along vertical branch 110a and horizontally along horizontal branch 110b so as to encompass first conduit 130a, second conduit 130b, and buffer chamber 160. As discussed below, jacket 150 is connected to a fluid circulating module 14 that allows fluid to be circulated through jacket 150 in order to maintain feedstock within dispensing unit 100 at a constant temperature (i.e., within +/−1 degree Celsius from the setpoint).

Figure 5:
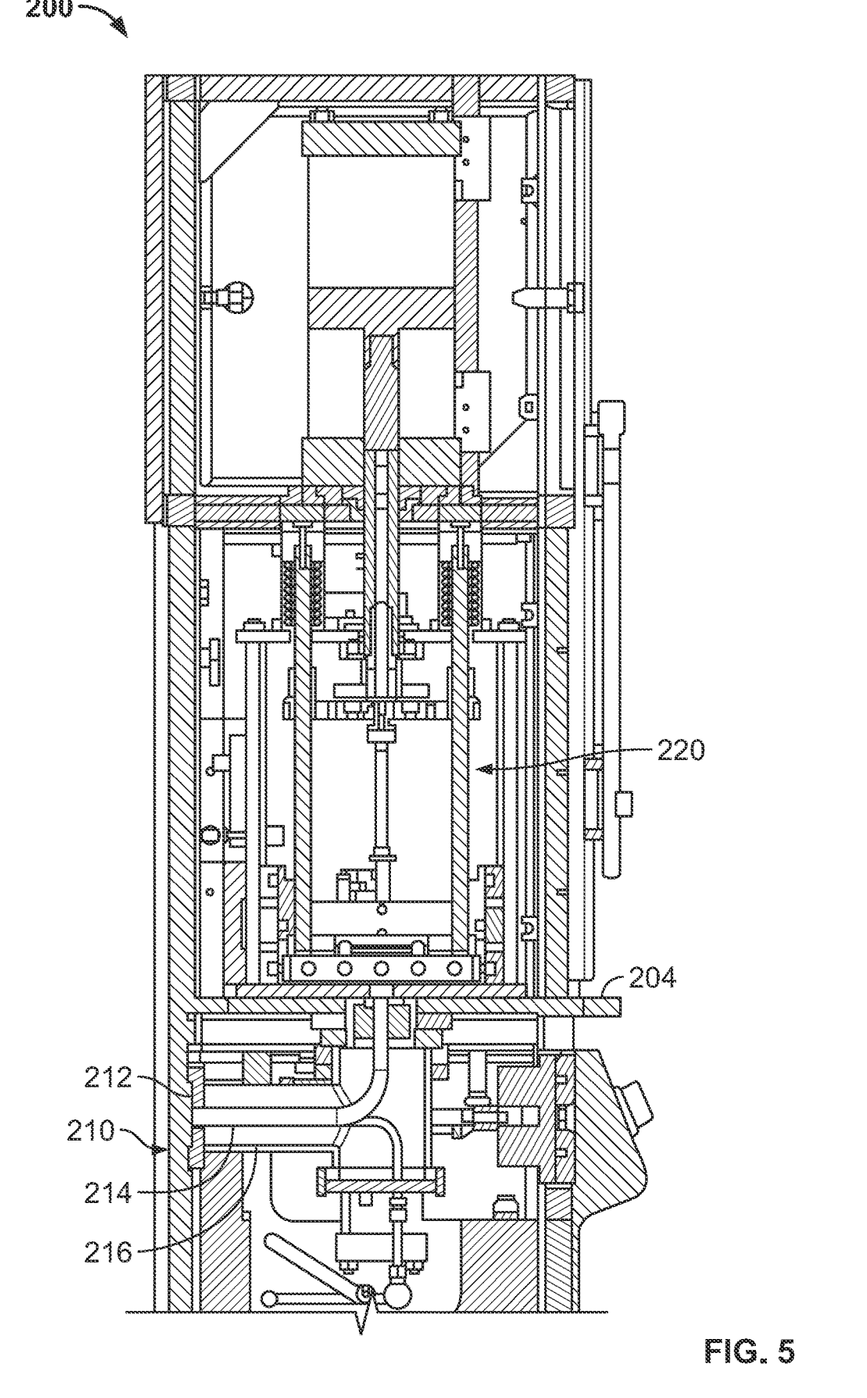
FIG. 5 is a partial cutaway view of the injection molding unit of FIG. 1.

Mold unit 200 generally includes a mold unit housing 202, a mold 220, a mold platform 204, a mold inlet conduit 214, flange 212, and a fluid jacket 216. 220 has mold plates that come together to define a cavity in the shape of the component or part being formed. Mold 220 is positioned on platform 204 and mold inlet conduit 214 extends through housing 202 to platform 204 where it is connected to mold 220 as best shown in FIG. 5. Flange 212 is arranged at the mold unit inlet 210 near a back-side of mold unit 200. Such flange 210 is configured to connect to flange 112b of dispensing unit 100. As indicated above, the densities of feedstocks in LPMIM processes are usually very sensitive to temperature variations. As such, delivery system 10 effectively controls temperature via fluid jackets 50 and 150. In order to help ensure consistent temperature up to the mold 220, mold unit 200 also includes a mold unit jacket 216 which surrounds mold unit inlet conduit 214. In this regard, a temperature controlled fluid can help maintain a constant temperature of feedstock as it exists delivery system 10 and enters into mold unit 200.

Figure 6:
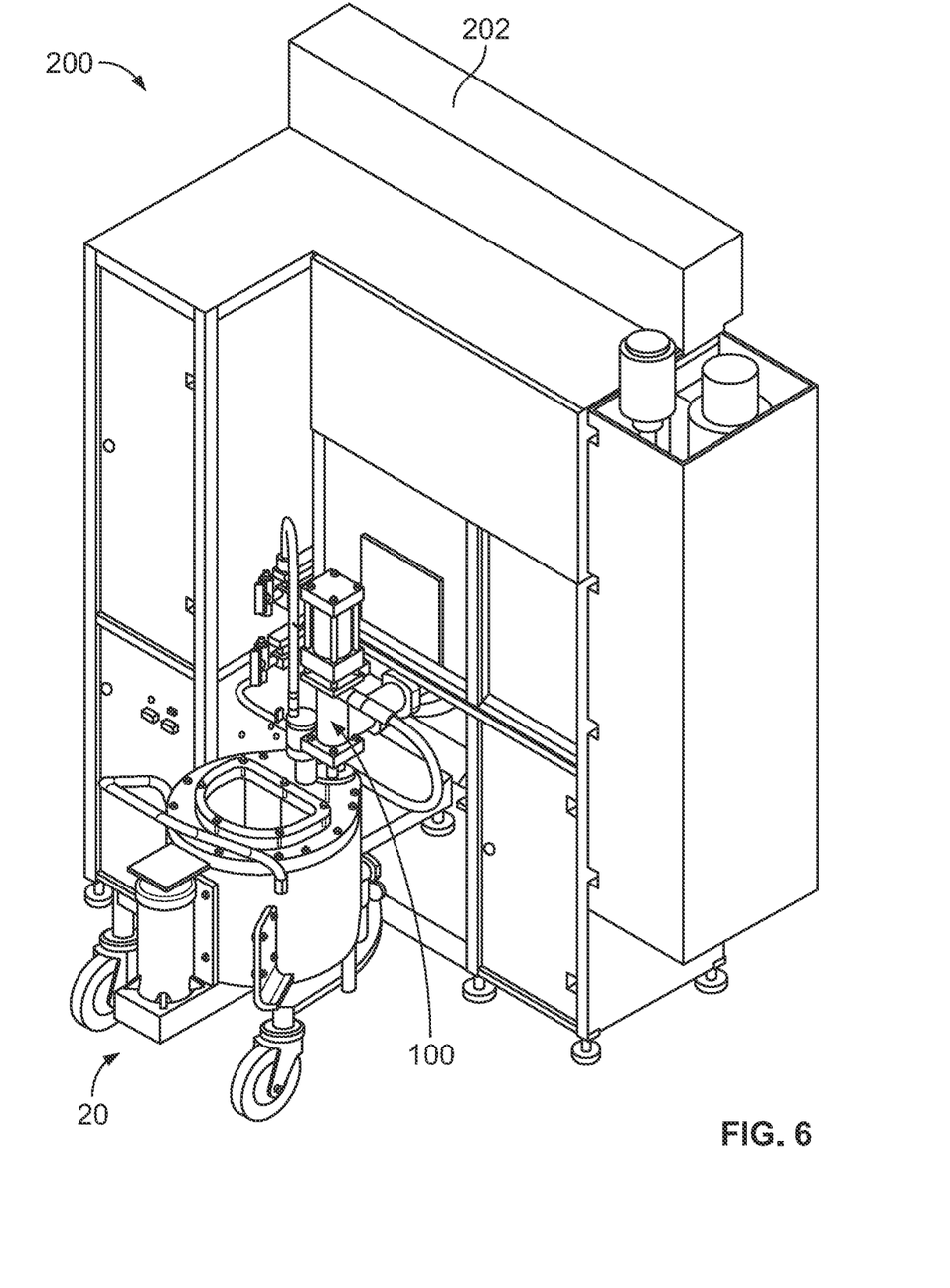
FIG. 6 is a rear perspective view of the injection molding system of FIG. 1 as assembled.
Figure 7:
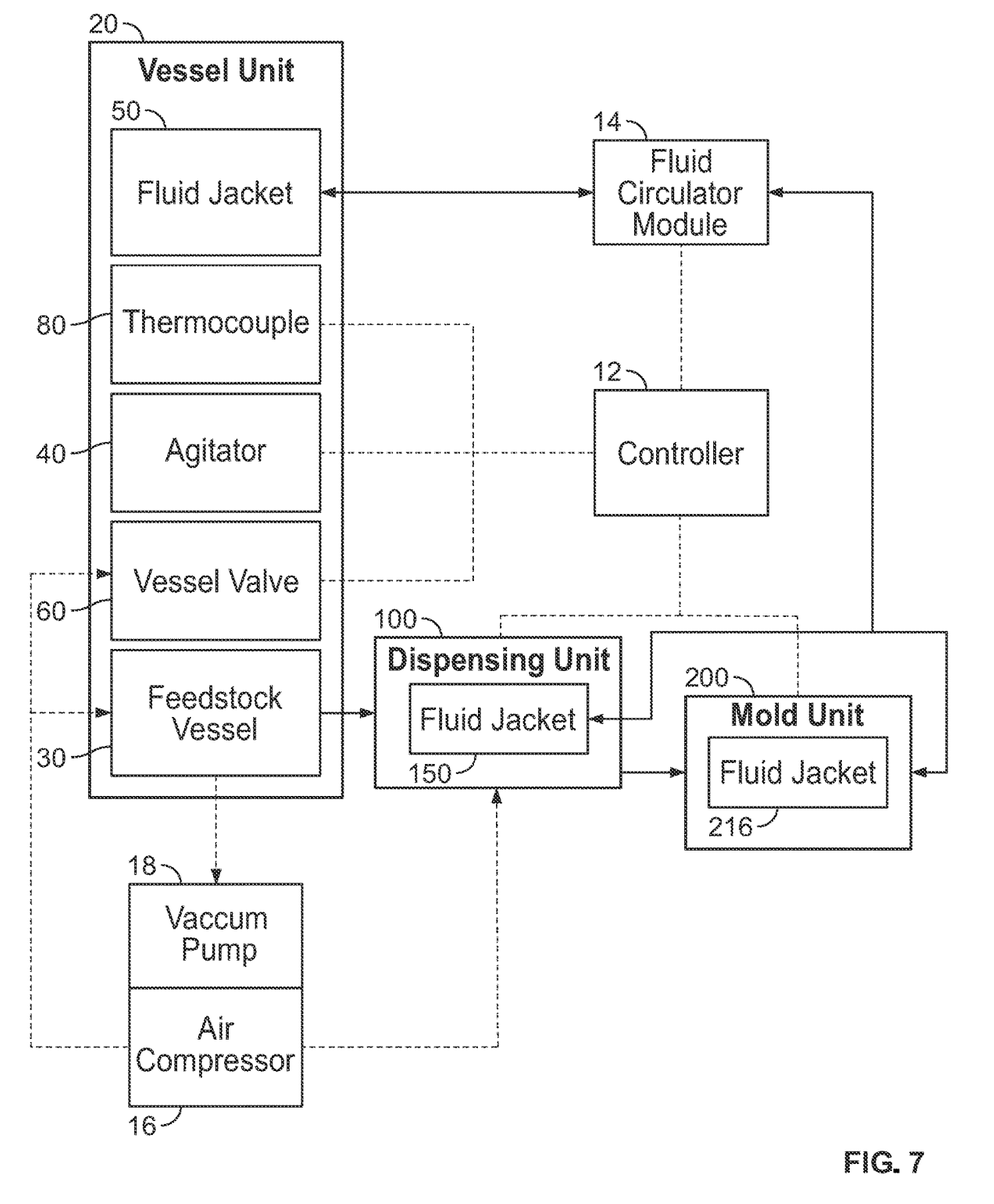
FIG. 7 is a schematic representation of the injection molding system of FIG. 1.

FIGS. 6 and 7 illustrate the assembled injection molding system. As assembled, dispensing unit 100 is connected to vessel unit 20 such that flange 112a connects to the top-side of vessel unit 20. Inlet conduit 130a communicates with vessel conduit 70 and, consequently, also communicates with vessel 30 such that feedstock from vessel 30 can flow into dispensing unit 100 when the appropriate valves are opened. Additionally, flange of dispensing unit 112b is connected to flange 212 of mold unit 200 such that second conduit 130b communicates with inlet conduit 214 of mold unit 200.

The system also includes fluid circulator module 14, controller 12, vacuum pump 18, and air compressor 16. One or more of these elements may be supported on the wheels 22 of vessel unit 20 so that it is transportable therewith. Fluid circulator module 14 may include a pump and a heat exchanger or some other known heating element. Fluid circulator 14, as shown, is in fluid communication with each of the fluid jackets 50, 150, 216 of vessel unit 20, dispensing unit 100, and mold unit 200. Each one of these fluid jackets 50, 150, 216 is separate such that fluid circulator module 14 separately and independently serves heated fluid to each of these units.

Air compressor 16 is connected to vessel unit 20 and dispensing unit 100. More particularly, air compressor provides compressed air to feedstock vessel 30 which helps generate pressure (e.g., 30 psi to 400 psi) used to push feedstock out of vessel 30. In addition, compressor 16 is connected to vessel valve 50 of vessel unit 20 and to first and second valves 120a-b of dispensing unit 100 in order to actuate each of these valves pneumatically.

The vacuum pump 18 is connected to vessel 30 of vessel unit 20 at a top-side thereof such that the vacuum 18 can communicate with a volume between the feedstock and door of vessel unit. Vacuum pump 18 may provide vacuum pressure in the free space above the feedstock to help condition the feedstock and eliminate internal voids that can be contained within the fluidized feedstock slurry. Thus, at various times in the processes, the free space above the feedstock may either exhibit a positive pressure involving a compressed gas or vacuum pressure.

Furthermore, controller 12 may be a single CPU or several different CPU's each dedicated to a separate unit. Such controller 12 receives feedback from the various units so as to monitor their internal conditions. For example, the thermocouple 80 of vessel unit 20 provides feedback to controller 12 regarding the fluid temperature within jacket 50. Such feedback is processed into a corresponding output which helps control the other elements within the units 20, 100, 200 to ensure that the feedstock remains at a constant temperature throughout the process. For example, as the temperature of feedstock increases toward the setpoint, controller 12 may slow the agitator 40 down to prevent the agitator 40 from generating too much heat within the feedstock. Controller 12 may also control the temperature of the fluid within jackets 50, 150, 216 and also the velocity with which such fluid circulates. Moreover, the controller 12 controls the timing of valves 60 and 120*a-b* so that the appropriate valves are opened and closed at the appropriate times.

Figure 8:
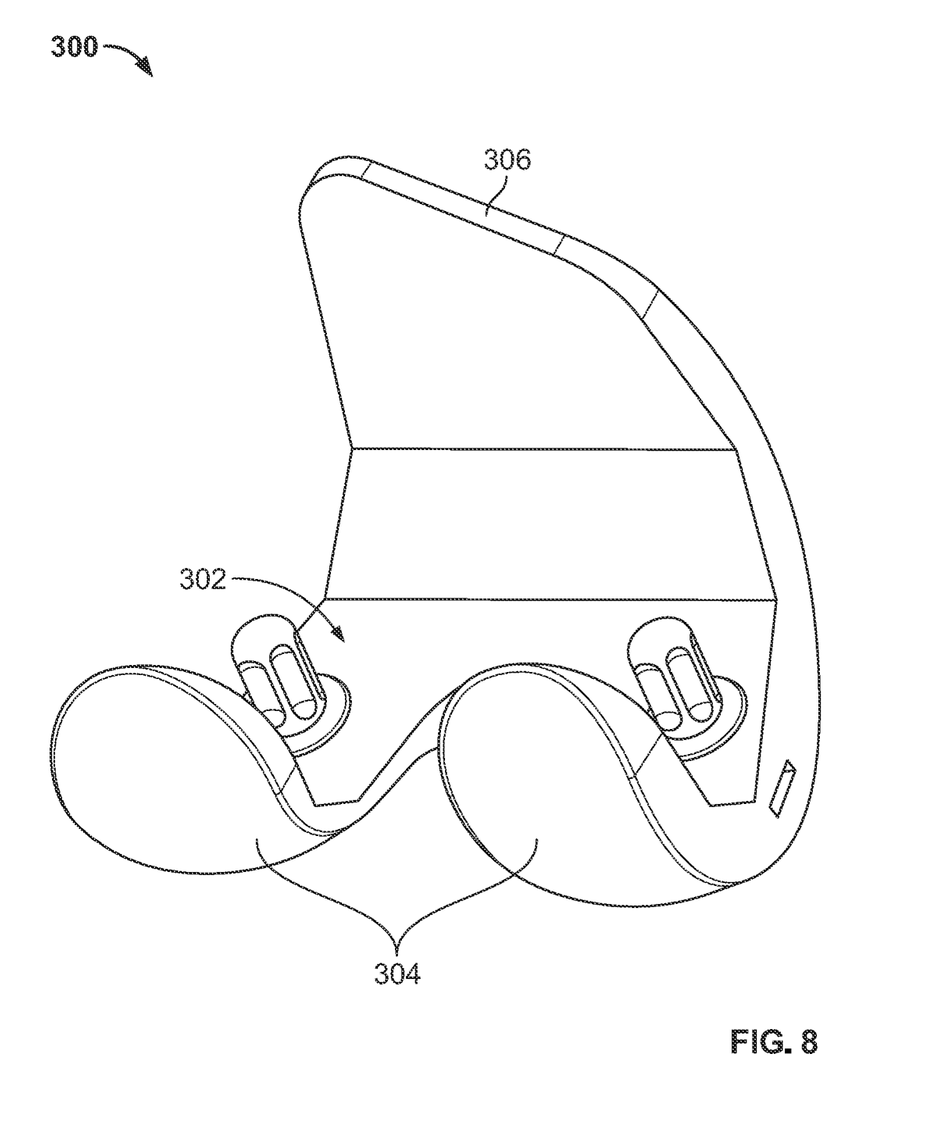
FIG. 8 is a rear perspective view of a femoral component of a knee joint prosthesis.

FIG. 8 depicts an end part 300 that can be created by the injection mold system described herein. End part 300, as shown, is a femoral component of a total knee prosthesis. Femoral component 300 includes an anterior flange 306 and condyles 304 that are connected by anterior flange 306. In addition, femoral component 300 includes a bone contact side 302 with five generally planar intersecting surfaces and an articular side that defines an articular surface for articulating with other components of the knee prosthesis. Other examples of femoral components and unique geometries thereof that can be produced by the injection molding system described herein can be found in U.S. Pat. No. 10,219,908 which is incorporated by reference herein in its entirety. Injection molding system can produce a myriad of other parts, particularly orthopedic devices. Other examples include, tibial baseplate components of a knee prosthesis, shoulder prostheses, hip prostheses, bone plates, intramedullary nails, arthrodesis implants, and the like. Delivery device system 10 provides the flexibility to be able to retrofit the system to produce any one of these devices. This can be done by simply swapping out the dispensing unit 100 for another volume appropriate unit.

In addition to that described above and illustrated in the figures, various other operations will now be described. Such operations are depicted in the flow chart of FIG. 9. It should be understood that the following operations do not have to be performed in the exact order described below. Instead, various steps may be handled in a different order or simultaneously. Steps may also be omitted or added unless otherwise stated therein.

Initially all of the raw components of the feedstock are brought together and mixed. As discussed above, the binder preferably has a composition that results in a low viscosity. As such, binder may include polymers and/or waxes. In the mixing step, predetermined proportions of the metallic powder and binder are mixed together to obtain a homogenous and predictable feedstock with the desirable rheological characteristics.

Once the raw, solid-phase feedstock components are mixed together, a desired volume of such feedstock is deposited within the internal volume of vessel 30. This is done by opening door 34 and dumping such feedstock into vessel 30. However, in some embodiments, the raw feedstock is not mixed first and is dumped straight into vessel 30 where it is mixed by agitator 40. When a sufficient volume has been introduced into vessel 30, door 34 is closed in order to create an air-tight seal. Vacuum pump 18 then operates so that the feedstock is agitated and heated under vacuum pressure. It is preferable that the volume of feedstock deposited within vessel 30 be more than half of the vessel's volume. Such a volume creates thermal momentum that dampens local temperature variations along the complete path of the feedstock. In addition, when recycled feedstock or new feedstock is introduced, the thermal momentum quickly heats the newly introduced material so that further runs can be performed soon thereafter.

The feedstock is continued to be mixed and heated within vessel 30 until a slurry is formed and the feedstock reaches the setpoint temperature. Heating is achieved by circulating heated fluid through jacket 50 of vessel unit 20. The heated fluid and contents of vessel 30 are closely monitored so that, once the feedstock reaches the setpoint temperature, such temperature does not deviate more than 1 degrees +/− from the setpoint. This helps ensure a homogenous suspension with consistent properties from vessel 30 to mold 220. Fluid jacket 50 facilitates this consistency in that circulating heated fluid minimizes temperature variances which are more prevalent with resistive heating elements and the like.

With delivery system 10 connected to mold unit 200, shots of feedstock are formed and dispensed into the molds 220. In this regard, the piston 140 is withdrawn to the second position making space for the feedstock within buffer chamber 160. Once the feedstock is heated to form a homogenous slurry, such slurry is metered by pumping in compressed air into vessel 30 above the slurry and then opening vessel valve 60. The pressure applied by the compressed air drives the slurry through conduit 70 into dispensing unit 100. The pressure behind the slurry is sufficient to overcome the spring 124 in the first cutoff valve 120*a*. Thus, feedstock passes into buffer chamber 160. However, since the second cutoff valve 120*b* has a stiffer spring 124, the feedstock cannot open second cutoff valve 120*b*. Thus, feedstock fills up buffer chamber 160 and the first cutoff valve closes 120*a* once filled.

Thereafter, the piston 140 is driven down from the second position back to the first position which drives the metered shot of feedstock through the second cutoff valve 120*b* and out of opening 104. The pressure generated by the piston 140 is sufficient to overcome the spring stiffness of valve 120*b*. Also, since the direction of the flow when the piston 140 is actuated is in the opposite direction from the spring's compression of valve 120*a*, valve 120*a* remains closed so that all of the feedstock in chamber 160 is dispensed from dispense unit 100. Once the feedstock exits opening 104, it enters into conduit 214 of mold unit 200. The temperature of feedstock is controlled by jacket 216 while feedstock makes its way to mold 220. The feedstock enters into mold 220 where it is cooled so that it solidifies and forms a green-part.

Once the green-part has been formed such that the feedstock has acquired the desired shape and has been removed from mold 220, the process advances to a debinding step in which the binder is systematically removed from the green-part so that the metal powder remains intact and is not distorted from the molded shape of the green-part. Depending on the binder selected, debinding can be performed using a solvent, such as water, or heat. Thermal debinding can be done in one debinding step or in multiple debinding steps. For example, one debinding step may include placing the green part in a wicking media, such as a powdered alumina, and ramping up the temperature such that certain components of the binder are wicked away into the wicking media leaving behind the metal powder and a backbone comprised of the remaining components of the binder. For example, the first debinding step may include wicking out the wax components leaving behind the polymer components as the backbone. The polymer components may then be debound in a second debinding step which may occur simultaneous with sintering to form a brown-part.

During the sintering step, the debound part is heated to a temperature that is just below the melting point of the metal powder. Thus, the metal powder particles fuse together without becoming molten liquid first. Sintering is preferably performed in a controlled atmosphere of inert gas, such as boron, for example. The temperature, duration of heat application and furnace atmosphere are controlled to ensure that the sintered component has the required densification and material properties desired. The sintering step densifies the component by removing the voids left behind from the debinding step. In many cases, the sintering step can result in the part shrinking. As discussed above, the delivery system 10 described herein allows for the feedstock to be highly loaded with powder so that this part shrinkage is minimal. Once the brown-part is formed by sintering, the part may be finished by polishing, machining, and the like.

Figure 9:
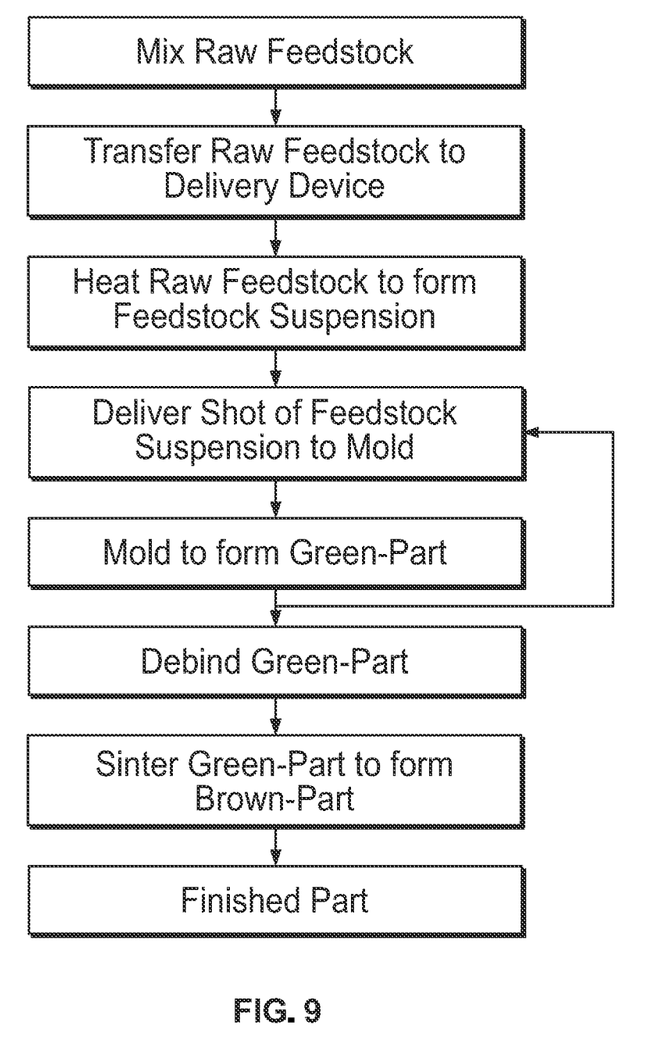
FIG. 9 is a flow chart of a method of manufacturing the knee joint prosthesis of FIG. 8.

As shown in FIG. 9, because of the large volume of feedstock contained within vessel 30, additional shots can be made and introduced into the mold 220 after the green-parts are removed from the mold 220. This can be done without having to go back through the process of mixing and heating the feedstock to the desired temperature. It should also be understood that scrap feedstock can be reintroduced into vessel via door. Such scrap will generally be much smaller in volume than the feedstock within vessel 30 such that the thermal momentum of the material within vessel will quickly heat and homogenize the scrap feedstock so that it can be used again in short order.

The described systems and devices allow for an isothermal LPMIM process such that a feedstock slurry is temperature controlled from the initial location in which the feedstock is fluidized and up to the mold. This helps provide consistent results by ensuring the feedstock has the desired density and other properties when introduced into the mold. Moreover, the feedstock can be highly loaded with metal powder which reduces the overall shrinkage a part experiences. Another significant advantage provided by the system described above is high throughput and manufacturing flexibility. Since LPMIM is conducted at a rather low temperature, there is no need to wait for equipment to cool before handling them like one would do with a high pressure process. Moreover, the modularity of dispensing unit 100 allows for a variety of volume shots to be generated from fundamentally the same equipment. Thus, feedstock delivery system 10 is quickly adaptable to a multitude of product lines. In addition, the large volume of vessel 30 as compared to the volume of buffer chamber 160 provides a large supply of conditioned feedstock at the ready which allows for run after run without any downtime.

Figure 10:
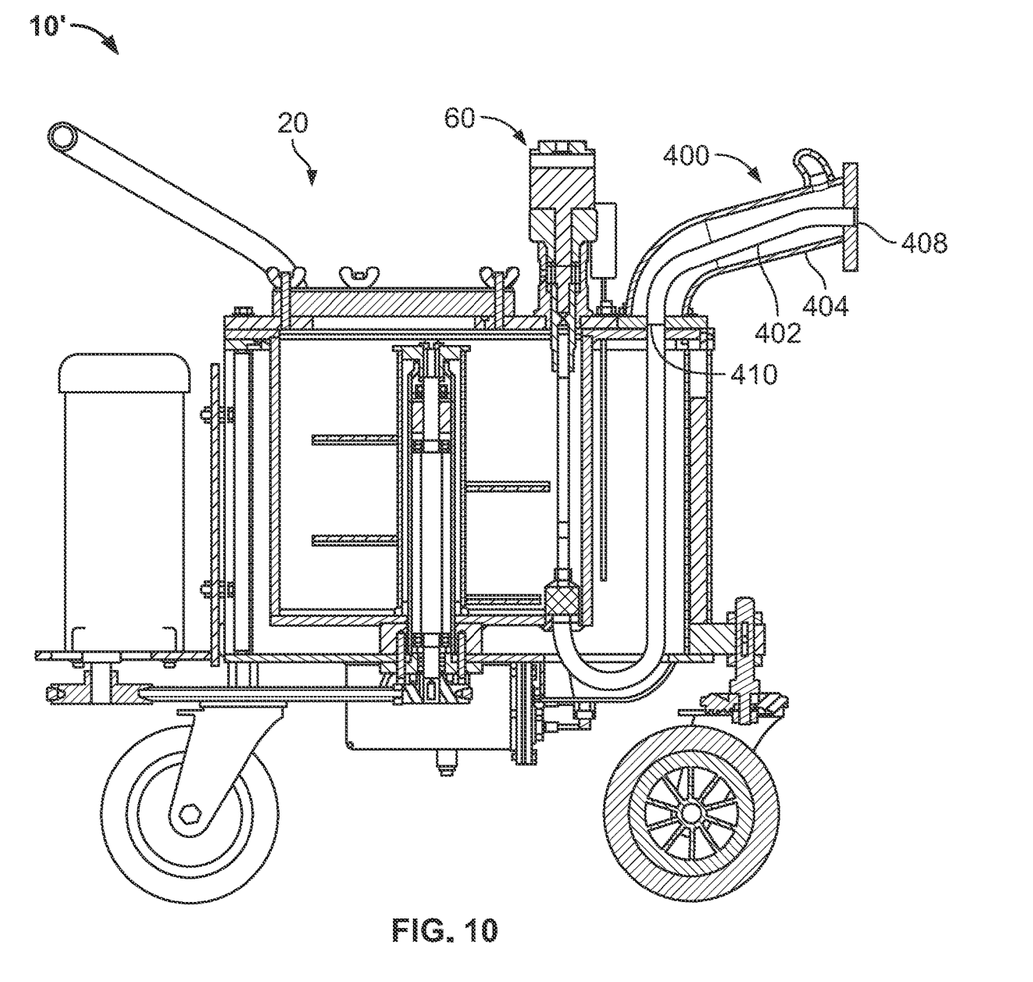
FIG. 10 is a cross-sectional view of a feedstock delivery system according to another embodiment of the present disclosure taken along a midline thereof.

A feedstock delivery system 10' according to another embodiment is illustrated in FIG. 10. The only feature that differs from the delivery system 10 of FIG. 2 is that delivery system 10' includes an alternative dispensing unit 400 connected to vessel unit 20. Dispensing unit 400 is a flow-through sleeve in which a single conduit 402 extends from a first end 410 to a second end 408 of the dispensing unit 400. In other words, conduit 402 extends uninterrupted from first end 410 to second end 408. Thus, unlike dispensing unit 100, dispensing unit 400 does not include any valves. As such, system 10' relies on vessel valve 60 to modulate the shot size. In this regard, once valve 60 of vessel unit 20 is opened, the entire volume of feedstock may flow through it unless it is cutoff by valve 60. Thus, it is contemplated that vessel unit 20 may be provided in a kit with a variety of dispensing units including dispensing unit 100 and dispensing unit 400 in order to address a variety of manufacturing needs. Dispensing unit 20, in addition to conduit 402, includes a fluid jacket 404 that surrounds conduit 402. Just like fluid jacket 150, such fluid jacket 404 may be a separate fluid chamber from that found in vessel unit 20.

Although feedstock delivery systems 10 and 10' are described herein in conjunction with a metal injection molding process, it should be understood that feedstock delivery systems 10 and 10' can be used in conjunction with other manufacturing techniques. For example, feedstock delivery systems 10 and 10' can connect to and operate in conjunction with wax casting systems.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A feedstock delivery system for injection molding, the feedstock delivery system comprising:
    a vessel unit having a vessel defining an internal volume thereof and an inlet opening in communication with the internal volume, the inlet opening defining an inlet of the feedstock delivery system for receipt of feedstock into the internal volume;
    a first dispensing unit having a first end, a second end, and a first conduit disposed therebetween, the first end being connected to the vessel unit such that the first conduit is in communication with the internal volume of the vessel, the second end being configured to connect to an injection mold and having an outlet opening defining an outlet of the feedstock delivery system;
    a fluid jacket enclosing at least a portion of the vessel and at least a portion of the first conduit of the first dispensing unit such that heated fluid flowing through the fluid jacket transforms the feedstock into a feedstock slurry and maintains the feedstock slurry at a constant temperature as it is dispensed from the internal volume of the vessel unit and out through the outlet opening of the first dispensing unit via at least the first conduit; and
    a variable speed agitator disposed within the vessel to agitate and further maintain the feedstock slurry at the constant temperature, the variable speed agitator being configured to operate while the feedstock slurry is disposed within the internal volume of the vessel unit and as the feedstock slurry is dispensed from the internal volume and out through the outlet opening of the first dispensing unit via at least the first conduit.

2. The feedstock delivery system of claim 1, wherein the vessel unit includes an outlet opening and a valve positioned at the outlet opening of the vessel, the valve being configured to regulate a flow of the feedstock slurry from the internal volume of the vessel to the first dispensing unit.

3. The feedstock delivery system of claim 2, wherein the valve has a head configured to move from a first position in which it obstructs the outlet opening of the vessel to a second position in which the outlet opening of the vessel is unobstructed by the head allowing feedstock slurry to flow therethrough, the head being configured to move linearly from the first position to the second position.

4. The feedstock delivery system of claim 3, wherein the vessel unit includes a vessel unit conduit extending from the outlet opening of the vessel to the first end of the first dispensing unit, the vessel unit conduit being enclosed by the fluid jacket.

5. The feedstock delivery system of claim 3, further comprising an air compressor connected to the vessel and in communication with the internal volume thereof such that compressed air from the air compressor imposes a pressure on the feedstock slurry to dispense the feedstock slurry from the internal volume of the vessel to the first dispensing unit when the valve is in the second position.

6. The feedstock delivery system of claim 1, wherein the first conduit extends from the first end to the second end of the first dispensing unit.

7. The feedstock delivery system of claim 1, wherein the first dispensing unit includes a second conduit, a buffer chamber, and a piston within the buffer chamber, the buffer chamber being in communication with the first and second conduits and disposed therebetween.

8. The feedstock delivery system of claim 7, wherein the first dispensing unit includes first and second valves, the first valve being arranged on the first conduit to regulate flow of the feedstock slurry between the first conduit and buffer chamber, the second valve being arranged on the second conduit to regulate flow of the feedstock slurry between the buffer chamber and second conduit, the second conduit defining the outlet opening of the feedstock delivery system.

9. The feedstock delivery system of claim 8, further comprising a second dispensing unit being alternatively connectable to the vessel unit and having first and second ends, first and second valves, and a buffer chamber, the first end of the second dispensing unit being connectable to the vessel unit such that the buffer chamber of the second dispensing unit is in communication with the internal volume of the vessel, the second end of the second dispensing unit being connectable to the injection mold and defining an outlet opening of the second dispensing unit, the buffer chamber of the second dispensing unit defining a second chamber volume larger than a first chamber volume of the first dispensing unit, the buffer chamber of the second dispensing unit being in communication with the outlet opening of the second dispensing unit and being positioned between the first and second valves thereof.

10. The feedstock delivery system of claim 9, a third dispensing unit having a first end, a second end, and a conduit extending uninterrupted from the first end to the second end thereof, the first end of the third dispensing unit being connectable to the vessel unit and the second end of the third dispensing unit defining an outlet opening of the third dispensing unit.

11. The feedstock delivery system of claim 1, further comprising a fluid circulator module in communication with the fluid jacket and configured to heat a fluid and circulate the fluid through the fluid jacket.

12. The feedstock delivery system of claim 11, wherein the fluid jacket includes a first fluid jacket at least partially enclosing the vessel of the vessel unit and a second fluid jacket at least partially enclosing the first conduit of the first dispensing unit, the first and second fluid jackets being separate from each other such that fluid flowing through the first fluid jacket is isolated from fluid flowing through the second fluid jacket.

13. A feedstock delivery system for injection molding, the feedstock delivery system comprising:
a vessel unit having a vessel defining an internal volume thereof and an inlet opening in communication with the internal volume for receipt of feedstock into the internal volume; and
first and second dispensing units being alternatively connectable to the vessel unit and each having first and second ends, first and second valves, and a buffer chamber, the first end being connectable to the vessel unit such that the buffer chamber is in communication with the internal volume of the vessel, the second end being connectable to an injection mold and defining an outlet of the feedstock delivery system, the outlet being in communication with the buffer chamber, and the buffer chamber being positioned between the first and second valves, wherein when the feedstock is caused to flow from the vessel unit toward the injection mold, the first valve is configured to open when the first valve is subject to a first pressure by the feedstock upstream of the first valve and the second valve is configured to open when the second valve is subject to a second pressure by the feedstock upstream of the second valve within the buffer chamber, the second pressure being greater than the first pressure,
wherein the buffer chamber of the first dispensing unit defines a first chamber volume and the buffer chamber of the second dispensing unit defines a second chamber volume greater than the first chamber volume.

14. The feedstock delivery system of claim 13, wherein the first dispensing unit includes a first fluid jacket enclosing the buffer chamber thereof and the second dispensing unit includes a second fluid jacket enclosing the buffer chamber thereof.

15. The feedstock delivery system of claim 14, wherein the vessel unit includes a third fluid jacket enclosing the vessel.

16. The feedstock delivery system of claim 13, wherein the first and second dispensing units each include a piston disposed within their respective buffer chambers.

17. The feedstock delivery system of claim 13, further comprising a third dispensing unit having a first end, a second end, and a conduit extending uninterrupted from the first end to the second end thereof, the first end being connectable to the vessel unit and the second end defining an outlet of the feedstock delivery system when the third dispensing unit is connected to the vessel unit.

18. The feedstock delivery system of claim 13, wherein the first and second valves each include a ball and a spring, the spring of the second valve having a greater spring stiffness than the spring of the first valve.

19. The feedstock delivery system of claim 18, wherein the first and second valves are axially arranged in a direction of a feedstock slurry flow such that the balls of the first and second valves travel linearly in a direction with the feedstock slurry flow.

* * * * *